(12) United States Patent
Ishizuka et al.

(10) Patent No.: US 7,417,844 B2
(45) Date of Patent: Aug. 26, 2008

(54) STACKED SOLID ELECTROLYTIC CAPACITOR

(75) Inventors: Hidetoshi Ishizuka, Sannohe (JP);
Toshiyuki Mizutani, Sannohe (JP);
Minoru Funahashi, Sannohe (JP);
Akira Ueda, Sannohe (JP); Katsuharu Yamada, Sannohe (JP); Kenya Sakurai, Sannohe (JP)

(73) Assignee: Fujitsu Media Devices Limited, Yokohama (JP)

( * ) Notice: Subject to any disclaimer, the term of this patent is extended or adjusted under 35 U.S.C. 154(b) by 39 days.

(21) Appl. No.: 11/481,246

(22) Filed: Jul. 6, 2006

(65) Prior Publication Data

US 2007/0022589 A1   Feb. 1, 2007

(30) Foreign Application Priority Data

Jul. 7, 2005   (JP) .............................. 2005-198660

(51) Int. Cl.
*H01G 4/30*   (2006.01)
(52) U.S. Cl. ................. 361/301.4; 361/301.5; 361/523; 361/525; 361/528; 361/516
(58) Field of Classification Search ......... 361/523–525, 361/528–534, 516–519, 540–541, 301.4, 361/301.5, 512; 29/25.01, 25.03
See application file for complete search history.

(56) References Cited

U.S. PATENT DOCUMENTS

| | | | |
|---|---|---|---|
| 6,836,401 B2 * | 12/2004 | Yoshida et al. | 361/538 |
| 6,870,728 B1 * | 3/2005 | Burket et al. | 361/538 |
| 6,912,117 B2 * | 6/2005 | Arai et al. | 361/523 |
| 7,006,348 B1 * | 2/2006 | Ueda et al. | 361/530 |
| 7,031,141 B2 * | 4/2006 | Kuriyama | 361/528 |
| 7,070,631 B2 * | 7/2006 | Monden et al. | 29/25.03 |
| 7,215,534 B2 * | 5/2007 | Saito et al. | 361/528 |

FOREIGN PATENT DOCUMENTS

| | | | |
|---|---|---|---|
| JP | 02001160524 | * | 6/2001 |
| JP | 2002-75792 | | 3/2002 |
| JP | 2002-299183 | | 10/2002 |
| JP | 2005-39040 | | 2/2005 |
| JP | 2005-72106 | | 3/2005 |

* cited by examiner

*Primary Examiner*—Nguyen T Ha
(74) *Attorney, Agent, or Firm*—Arent Fox LLP.

(57) ABSTRACT

A stacked solid electrolytic capacitor has an anode foil composed of a valve metal, a cathode foil having carbon grains that are evaporated or physically adhered to a surface thereof, a separator and a solid electrolytic layer composed of a conducting polymer. The anode foil, the separator and the cathode foil are stacked in order. The solid electrolytic layer is formed between the anode foil and the cathode foil.

5 Claims, 5 Drawing Sheets

STACKED SOLID ELECTROLYTIC CAPACITOR

BACKGROUND OF THE INVENTION

1. Field of the Invention

This invention generally relates to a stacked solid electrolytic capacitor.

2. Description of the Related Art

Recently, there are demands for enhancing capacity of an electrolytic capacitor, for downsizing the electrolytic capacitor and further for lowering impedance at higher frequencies of the electrolytic capacitor, as electronics devices are digitalized. The solid electrolytic capacitor has an excellent frequency characteristic relative to other electrolytic capacitors, and thus attracts attentions. A roll-formed solid electrolytic capacitor, a stacked solid electrolytic capacitor and so on are used as the solid electrolytic capacitor.

A conventional electrolytic capacitor has an aluminum foil acting as a valve metal, and has an electrolyte layer composed of polypyrrole formed by a chemical polymerizing method, an electropolymerizing method or the like. The electrolytic layer composed of the polypyrrole is, however, not evenly formed on the surface of the aluminum foil, and is brittle. The stacked electrolytic capacitor has, therefore, problems such as increase of a leakage current or an electrical short.

And so, Japanese Patent Application Publication No. 2002-299183 (hereinafter referred to as Document 1) discloses a method where a precoated layer composed of manganese dioxide is formed in advance and the polypyrrole is formed on the precoated layer later. However, the arrangement disclosed in Document 1 has a problem that equivalent series resistance (ESR) increases, because there is a resistance between the precoated layer and the electrolyte layer. It is, therefore, not possible to obtain sufficient property.

And so, Japanese Patent Application Publication No. 2002-75792 (hereinafter referred to as Document 2) discloses an art where a separator is provided between a cathode foil and an anode foil, and a polyethylene terephthalate (PET) formed by a heat and pressure polymerization is used as the electrolyte layer. It is possible to enhance capacity, if the solid electrolytic capacitors in accordance with the art of Document 2 are stacked. And Japanese Patent Application Publication No. 2005-39040 (hereinafter referred to as Document 3) and Japanese Patent Application Publication No. 2005-72106 (hereinafter referred to as Document 4) discloses an art where a cathode layer composed of a graphite layer and a silver paste layer is provided. The arrangements disclosed in Document 3 and Document 4 can solve a problem concerning a high-frequency response.

However, there is a measurable connection resistance in the solid electrolytic capacitor in accordance with the art of Document 2, because the electrodes and outgoing leads are connected electrically. And it is necessary to connect the outgoing leads as many as the stacked electrode foils, although it is possible to enhance capacity by stacking the electrode foils. And the connection resistance increases. Accordingly, the high frequency response gets worse. And it is difficult to reduce the thickness of the electrolytic capacitor as the quantity of electrode foils increases.

Further, in the solid electrolyte capacitor in accordance with the arts of Document 3 and Document 4, a short circuit may be generated at the graphite layer and the silver layer, because there is a fault at a dielectric oxide layer of the anode.

SUMMARY OF THE INVENTION

The present invention has an object to provide a stacked solid electrolytic capacitor being superior in frequency response, having a high capacity, being thinned and having a short resistance.

According to an aspect of the present invention, preferably, there is provided a stacked solid electrolytic capacitor including an anode foil composed of a valve metal, a cathode foil having carbon grains that are evaporated or physically adhered to a surface thereof, a separator and a solid electrolytic layer composed of a conducting polymer. The anode foil, the separator and the cathode are stacked in order. The solid electrolytic layer is formed between the anode foil and the cathode foil.

With the above-mentioned configuration, the cathode foil and the anode foil are stacked with the separator arranged between the cathode foil and the anode foil. And it is restrained that the cathode foil and the anode foil are in touch with each other. The short resistivity is thus improved. In addition, a metal forming the cathode foil is not directly in touch with the conducting polymer layer, but the cathode foil is in touch with the conducting polymer layer through an organic matter, the carbide grains. And adhesiveness between the cathode foil and the conducting polymer layer is advanced. In addition, a void between the carbide grains is larger than an etching pit of an ordinary oxide layer. And the conducting polymer layer is formed effectively. Accordingly, the interface resistance between the cathode foil and the conducting polymer layer is reduced, and it is possible to reduce the tan $\delta$ and the ESR. And the frequency response of the stacked solid electrolytic capacitor is improved. In addition, the cathode foil, the carbide grains and the conducting polymer layer are conducted electrically during an energization of the solid electrolytic capacitor. And the carbide grains and the conducting polymer layer do not affect the capacity as a cathode of the solid electrolytic capacitor. And the anode side electrical capacity is combined capacity of the solid electrolytic capacitor. It is possible to advance a capacity achievement ratio of the solid electrolytic capacitor in accordance with the present invention. And it is possible to reduce the quantity of the unit element, because the capacity of the stacked solid electrolytic capacitor is enhanced. It is thus possible to reduce the thickness of the stacked solid electrolytic capacitor.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

Figure 1:
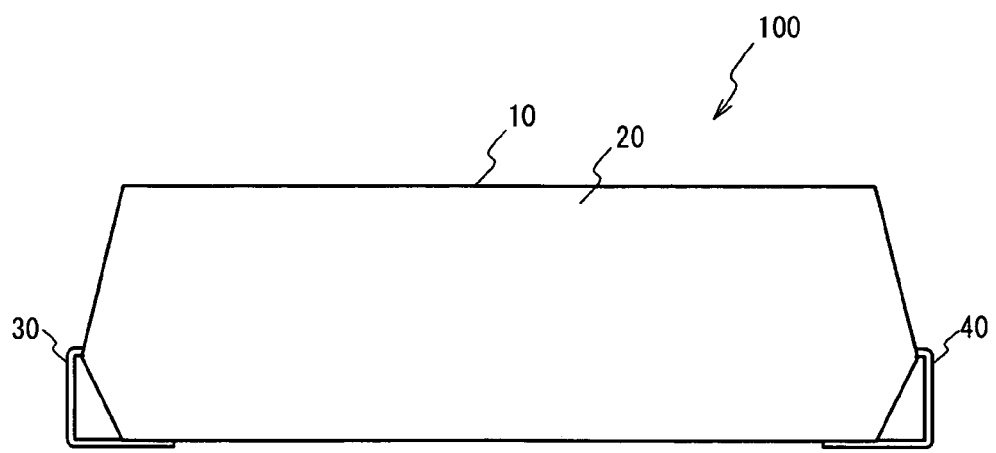
FIG. 1 illustrates a schematic external view of a stacked solid electrolytic capacitor, which is an example in accordance with an embodiment of the present invention.

FIG. 1 illustrates a schematic external view of a stacked solid electrolytic capacitor 100, which is one of examples in accordance with the embodiment of the present invention. As shown in FIG. 1, the stacked solid electrolytic capacitor 100 has a capacitor element 10, a cathode terminal 30 and an anode terminal 40. The surface of the capacitor element 10 is molded with a resin 20. A description will be given of the capacitor element 10.

Figure 2A:
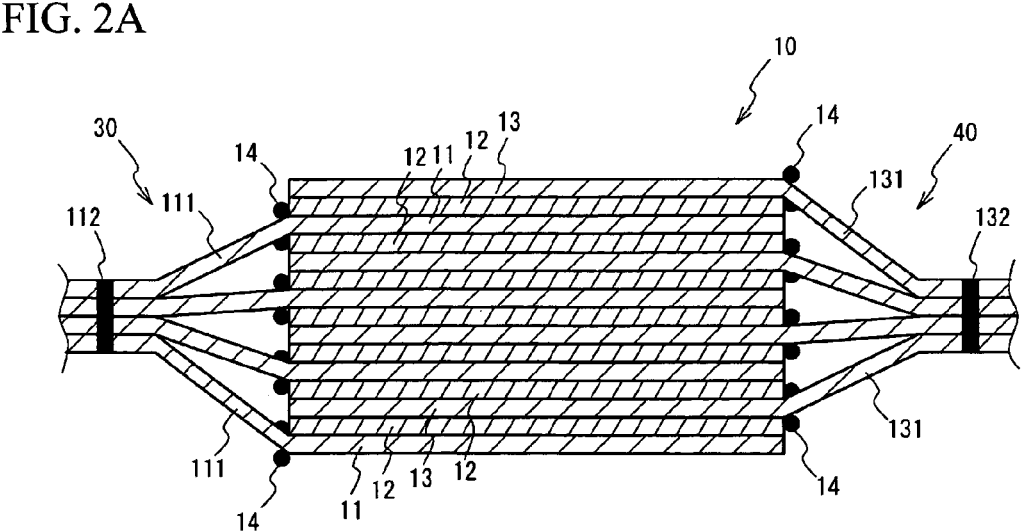
FIG. 2A and FIG. 2B illustrate a detail of a capacitor element.
Figure 2B:
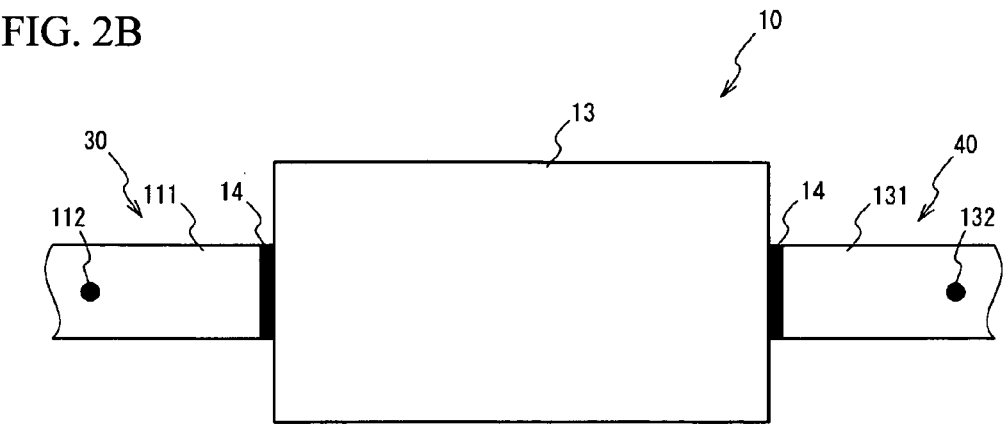

FIG. 2A and FIG. 2B illustrate a detail of the capacitor element 10. FIG. 2A illustrates a schematic cross sectional view of the capacitor element 10. FIG. 2B illustrates a schematic top view of the capacitor element 10. As shown in FIG. 2A and FIG. 2B, the capacitor element 10 has a structure in which unit elements are stacked, the unit elements having a structure in which a separator 12 and an anode foil 13 are stacked on a cathode foil 11 in order. And the separator 12 is stacked between the unit elements. It is restrained that the cathode foil 11 and the anode foil 13 are in contact with each other directly. The short resistivity of the capacitor element 10 is thus improved.

The cathode foil 11, the separator 12 and the anode foil 13 have a plate shape. The shape of the cathode foil 11, the separator 12 and the anode foil 13 are not limited in particular, and may be rectangular or circular. An outgoing part 111 is formed as a unit with the cathode foil 11. An outgoing part 131 is formed as a unit with the anode foil 13. The cathode foil 11 and the outgoing part 111 are formed of a foil. The anode foil 13 and the outgoing part 131 are formed of a foil. There is no connection resistance at the outgoing part 111 and 131. It is thus possible to reduce the electrical resistance, relative to a case where a lead is connected to each of the electrode foil.

The outgoing parts 111 are connected to each other through a welded part 112. The outgoing parts 131 are connected to each other through a welded part 132. The welded parts 112 and 132 are formed by a welding such as laser welding, resistance welding or ultrasonic welding. It is thus reduce the electrical resistance efficiently. Accordingly, the high frequency response of the stacked solid electrolytic capacitor 100 in accordance with the embodiment is improved. In addition, the outgoing parts 111 connected to each other with the welded part 112 form the cathode terminal 30. The outgoing parts 131 connected to each other with the welded part 132 form the anode terminal 40.

Insulating layers 14 are provided at end parts of the cathode foil 11 side of the both surfaces of the outgoing part 111 and at end parts of the anode foil 13 side of the both surfaces of the outgoing part 131. It is thus restrained that a conductive polymer described later bleeds from the separator 12. The insulating layer 14 is composed of an insulated synthetic resin such as a silicon resin, an epoxy resin, a polyamide resin or a polyimide resin.

The positions where the outgoing parts 111 and 131 are provided and the quantity of the outgoing parts 111 and 131 are not limited in particular. The outgoing parts 111 may be formed at the cathode foil 11. The outgoing parts 131 may be formed at the anode foil 13. The outgoing parts 111 and 131 may be formed at one side of the capacitor element 10, although the outgoing part 111 is formed at one side of the capacitor element 10 and the outgoing part 131 is formed at the other side of the capacitor element 10 in FIG. 2A and FIG. 2B. In this case, it is necessary to arrange the outgoing parts 111 and 131 not to be overlapped each other when the outgoing parts 111 and 131 are welded. The connection resistance between the capacitor element 10 and an outside part is reduced further, if the quantity of the outgoing parts 111 and 131 increases.

Figure 3:
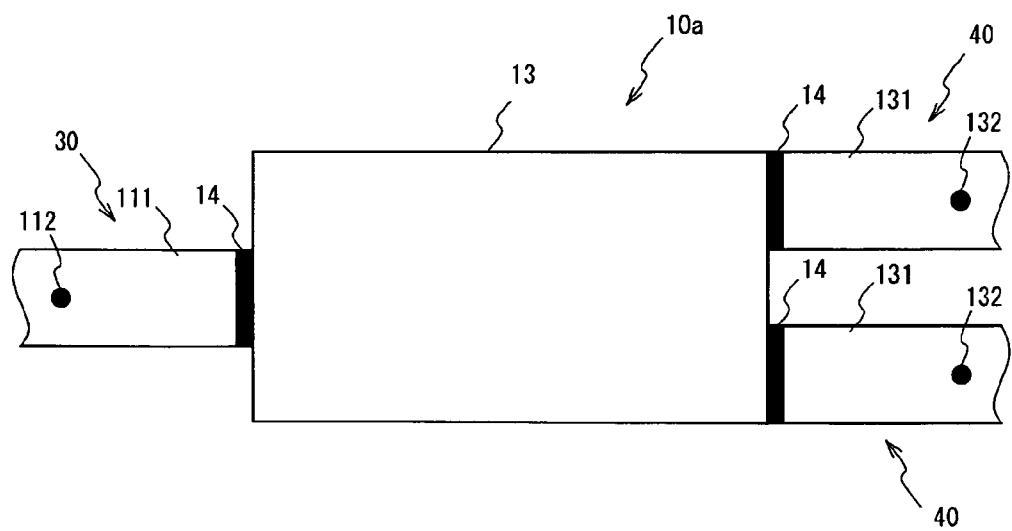
FIG. 3 illustrates a capacitor element as another example of the capacitor.
Figure 4:
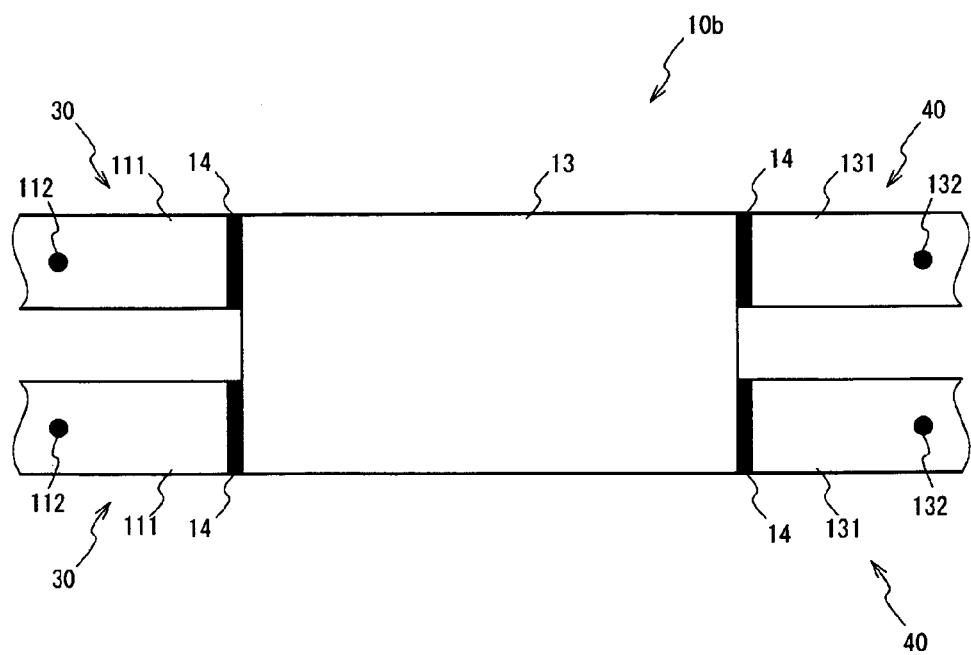
FIG. 4 illustrates a capacitor element as another example of the capacitor.

FIG. 3 illustrates a capacitor element 10a as another example of the capacitor element 10. FIG. 4 illustrates a capacitor element 10b as another example of the capacitor element 10. In the capacitor element 10a, the outgoing part 111 is formed at one side of the cathode foil 11, and two outgoing parts 131 are formed at the other side of the anode foil 13, as shown in FIG. 3. In the capacitor element 10b, two outgoing parts 111 are formed at one side of the cathode foil 11, and two outgoing parts 131 are formed at the other side of the anode foil 13, as shown in FIG. 4. As mentioned above, the positions where the outgoing parts 111 and 131 are provided and the quantity of the outgoing parts 111 and 131 are not limited in particular.

Figure 5:
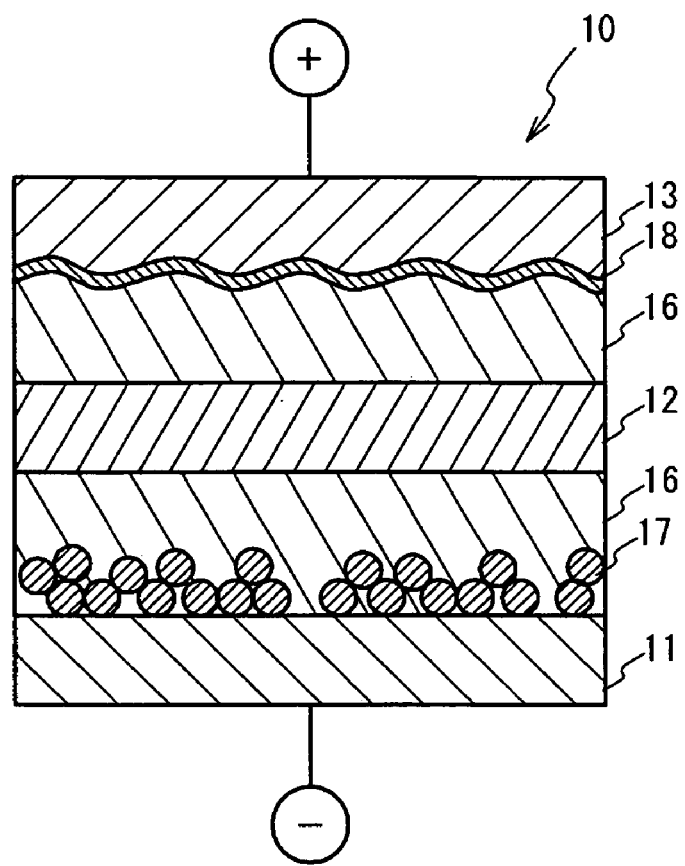
FIG. 5 illustrates a schematic cross-sectional view of a cathode foil, a separator and an anode foil.

A description will now be given of the materials and so on of the capacitor element 10. FIG. 5 illustrates a schematic cross-sectional view of the cathode foil 11, the separator 12 and the anode foil 13. As shown in FIG. 5, there are formed conducting polymer layers 16 acting as electrolyte layers between the cathode foil 11 and the separator 12 and between the anode foil 13 and the separator 12.

The cathode foil 11 may be composed of a metal such as aluminum, copper, iron or nickel. The cathode foil 11 is formed of an aluminum foil, in the embodiment. The thickness of the cathode foil 11 is, for example, 30 μm. The surface of the cathode foil 11 is subjected to a vapor deposition treatment or a physical adsorption treatment of carbide. And carbide grains 17 are thus adsorbed to the surface of the cathode foil 11.

In this case, a metal forming the cathode foil 11 is not directly in touch with the conducting polymer layer 16, but the metal is in touch with the conducting polymer layer 16 through an organic matter, the carbide grains 17. The adhesiveness between the cathode foil 11 and the conducting polymer layer 16 is thus advanced. In addition, a void between the carbide grains 17 is larger than an etching pit of an ordinary oxide layer. And the conducting polymer layer 16 is formed effectively. Accordingly, an interface resistance between the cathode foil 11 and the conducting polymer layer 16 is reduced, and it is possible to reduce the tan $\delta$ and the ESR. And the frequency response of the stacked solid electrolytic capacitor 100 is improved.

In addition, the cathode foil 11, the carbide grains 17 and the conducting polymer layer 16 are conducted electrically during the energization of the stacked solid electrolytic capacitor 100. The carbide grains 17 and the conducting polymer layer 16 do not affect the capacity as a cathode of the stacked solid electrolytic capacitor 100. And the anode side electrical capacity is a combined capacity of the stacked solid electrolytic capacitor 100. It is thus possible to advance the capacity achievement ratio of the stacked solid electrolytic capacitor 100. In addition, it is possible to reduce the quantity of the unit element, because the capacity of the stacked solid electrolytic capacitor 100 is enhanced. And it is possible to reduce the thickness of the stacked solid electrolytic capacitor 100. In addition, it is possible to change the capacity of the stacked solid electrolytic capacitor 100 to a desirable value when the quantity of the unit element is adjusted.

Materials of the carbide grains 17 are not limited particularly if the carbide grains include carbon. For example, carbon grains such as carbon, graphite, carbon nitride, carbide or carbon compound can be used for the carbide grains 17. The thickness of a layer where the carbide grains 17 are held is, preferably, 0.1 μm to 5 μm and is, more preferably, 1 μm to 2 μm. Because the combined capacity of the stacked solid electrolytic capacitor 100 increases when the thickness of the layer where the carbide grains 17 are held is in the range mentioned above. In addition, the carbide grains 17 may be held by whiskers formed on the surface of the cathode foil 11.

The anode foil 13 is formed of a valve metal having a dielectric oxide layer 18 on a surface thereof. A metal like aluminum can be used for the anode foil 13. The thickness of the anode foil 13 is, for example, 100 μm. It is possible to form the dielectric oxide layer 18 by etching and chemically oxidizing the surface of the anode foil 13.

It is possible to form the anode foil 13 by cutting off a valve metal having a dielectric oxide layer formed on the surface thereof. In the process of the cutoff, the valve metal is exposed at the edge face of the anode foil 13, and a fault of the dielectric oxide layer is formed. It is thus necessary to form a dielectric oxide layer on the exposed valve metal. It is possible, for example, to form the dielectric oxide layer on the exposed valve metal by multiple chemical treatments and thermal treatments after the cutoff. The anode foil 13 is subjected to the chemical treatment at a voltage near a formation voltage of the dielectric oxide layer 18, using chemical liquid mainly containing 0.5% to 2% ammonium adipate by weight. The anode foil 13 is subjected to the thermal treatment in temperature range 200 degrees C. to 280 degrees C.

The separator 12 is mainly composed of a synthetic fiber which is formed of one or more polymer fibers such as PET fiber, acrylic fiber or the like. It is possible to form the conducting polymer layer 16 by impregnating appropriate quantity of polymerizable monomers and an oxidizing reagent into the separator 12. The conducting polymer layer 16 is formed of a polymerizable material such as polyethylene dioxythiophene. In a case where polyethylene dioxythiophene is used for the conducting polymer layer 16, a resistivity of the conducting polymer layer 16 and the ESR are reduced. It is possible to form the conducting polymer layer 16 of polyethylene dioxythiophene by polymerizing polymerizable polymer such as 3,4-ethylene dioxythiophene using an oxidizing reagent.

Instead of the polymerizable monomer, a monomer solution in which the polymerizable monomer and a volatility liquid solution are blended at a ratio 1:1 to 1:3 can be used. Hydrocarbon such as pentane, ether such as tetrahydrofuran, ester such as ethyl formate, ketone such as acetone, alcohol such as methanol, or nitrogen compound such as acetonitrile or the like which have one or more carbon atoms or a mixture of these mentioned above can be used for this volatility liquid solution. It is preferred to use methanol, ethanol or acetone or the like, in particular.

It is possible to use an organic solvent which is alcohol such as ethanol, butanol or the like having one or more carbon atoms, as the oxidizing reagent. In this case, the molecular of the oxidizing reagent are dispersed and the polymerization reaction of the polymerizable polymer mentioned above is promoted. And it is possible to reduce polymerization time. It is possible to use alcohol solution in which one or more of ferric p-toluene sulfonate, ferric dodecylbenzenesulfonate, ferric methoxybenzenesulfonate and ferric alkylbenzene sulphonic acid are soluted. The ratio of the solvent mentioned above and the acid ferric may be optional. It is preferable to use a liquid solution containing 40% to 70% of the acid ferric by weight. In this case, the concentration of the oxidizing reagent is high. And a polymer that is more dense and has a high yield point, is formed through the polymerization reaction of the polymerizable monomer mentioned above. The conducting polymer layer 16 therefore excels in conductivity.

And it is possible to reduce the ESR. In addition, preferably the compounding ratio of the polymerizable monomer and the oxidizing reagent is 1:3 to 1:6.

EXAMPLES

Example 1

In an example 1, the stacked solid electrolytic capacitor 100 shown in FIG. 1 was fabricated. The cathode foil 11 was formed of an aluminum, which had 30 μm thickness. The carbide grains 17 were formed on the surface of the cathode foil 11. The thickness of the layer where the carbide grains 17 were held was 2 μm. A material mainly formed of a synthetic fiber was used for the separator 12. The anode foil 13 was formed of an aluminum foil, which was subjected to an etching treatment and a chemical treatment and had 100 μm thickness. The cathode foil 11 and the anode foil 13 were cut off into a foil having a given size. The active electrode area had 14 mm length and 10 mm width.

Next, the anode foil 13 was subjected to a chemical treatment at a voltage near the formation voltage of the dielectric oxide layer of the anode foil 13 using chemical liquid mainly containing 0.5% to 2% ammonium adipate by weight, and to a thermal treatment in temperature range 200 degrees C. to 280 degrees C. Then, the insulating layers 14 were formed on the cathode foil 11 and the anode foil 13 respectively. Next, ten unit elements were stacked with the separators 12 arranged between each of the unit elements, the unit element having a structure in which the cathode foil 11, the separator 12 and the anode foil 13 were stacked in order.

Then, a pure monomer and an oxidizing reagent in which 60% ferric p-toluene sulfonate was solved in an ethanol solvent were impregnated into the separator 12. The separator 12 was heated gradually and the conducting polymer layer 16 was formed. Next, the welded parts 112 and 131 were formed by the laser welding. Then, the exterior of the capacitor element 10 was molded with the resin 20. After that, the capacitor element 10 was subjected to a voltage treatment. Then, the stacked solid electrolytic capacitor 100 was fabricated. The capacity of the stacked solid electrolytic capacitor in accordance with the example 1 was 2.5V1500 μF.

Comparative Example 1 and 2

In a comparative example 1, a stacked solid electrolytic capacitor in accordance with the example 1, which does not have the outgoing parts 111 and 131, was fabricated. Outgoing leads were connected to the cathode foil and the anode foil respectively. A conventional chemically treated foil was used for the cathode foil. In a comparative example 2, a conventional stacked solid electrolytic capacitor, which has the same anode foil as the anode foil 13 in accordance with the example 1 and does not have a cathode and a separator, was fabricated. The capacity of the stacked solid electrolytic capacitors in accordance with the comparative examples 1 and 2 was 2.5V1500 μF.

(Analysis)

Table 1 shows an electrical capacity, the tan δ, the leakage current and the ESR of the stacked solid electrolytic capacitors in accordance with the example 1 and the comparative examples 1 and 2. Thirty stacked solid electrolytic capacitors in accordance with the example 1 and comparative example 1 and 2 were respectively fabricated, and each value in Table 1 shows average value thereof.

TABLE 1

|  | Electrical capacity (μF) | tanδ (%) | Leakage current (μA/2 minutes) | ESR (mΩ) |
| --- | --- | --- | --- | --- |
| Example 1 | 1508 | 5.9 | 125 | 3.9 |
| Comparative Example 1 | 733 | 6.9 | 127 | 7.8 |
| Comparative Example 2 | 1423 | 6.4 | 263 | 5.2 |

As shown in Table 1, with respect to the stacked solid electrolytic capacitor in accordance with the example 1, the electrical capacity was increased considerably, and the tan δ, the leakage current and the ESR were reduced considerably, relative to the stacked solid electrolytic capacitors in accordance with the comparative example 1 and 2. This is because the adhesiveness between the carbide grains and the conducting polymer layer was advanced, forming condition of the conducting polymer layer in the large void between the carbide grains was fine, and the interface resistance was reduced.

In addition, the cathode foil, the carbide grains and the conducting polymer layer were conducted electrically. And, the capacitor as a cathode was not affected by the existence of the carbide grains and the conducting polymer layer. The anode side electrical capacity was the combined capacity of the stacked solid electrolytic capacitor. It is thought that the property mentioned above was obtained because the capacity achievement ratio of the solid electrolytic capacitor was advanced considerably.

While the preferred embodiments of the prevent invention have been illustrated in detail, the invention is not limited to the specific embodiments above. In addition, it will be appreciated that the invention is susceptible of modification, variation and change without departing from the proper and fair meaning of the accompanying claims.

The present invention is based on Japanese Patent Application No. 2005-198660 filed on Jul. 7, 2005, the entire disclosure of which is hereby incorporated by reference.

What is claimed is:

1. A stacked solid electrolytic capacitor comprising:
    an anode foil composed of a valve metal;
    a cathode foil having carbon grains that are evaporated or physically adhered to a surface thereof;
    a separator; and
    a solid electrolytic layer composed of a conducting polymer,
    wherein:
    the anode foil, the separator and the cathode foil are stacked in order; and
    the solid electrolytic layer is formed between the anode foil and the cathode foil.

2. The stacked solid electrolytic capacitor as claimed in claim 1, wherein:
    an outgoing part is formed as a unit with the anode foil; and
    the anode foil and the outgoing part are formed of one sheet of foil.

3. The stacked solid electrolytic capacitor as claimed in claim 1, wherein:
    an outgoing part is formed as a unit with the cathode foil; and
    the cathode foil and the outgoing part are formed of a foil.

4. The stacked solid electrolytic capacitor as claimed in claim 3, wherein:
    more than one unit element that is formed of the cathode foil, the separator and the anode foil are stacked; and
    the outgoing parts of the cathode foils are connected to each other by welding.

5. The stacked solid electrolytic capacitor as claimed in claim 1, wherein:
    more than one unit element that is formed of the cathode foil, the separator and the anode foil are stacked;
    outgoing parts of the cathode foil are connected to each other by welding; and
    outgoing parts of the anode foil are connected to each other by welding.

* * * * *